United States Patent [19]
DeLaurier et al.

[11] Patent Number: 5,288,039
[45] Date of Patent: Feb. 22, 1994

[54] SPANWISE GRADED TWIST PANEL

[76] Inventors: James D. DeLaurier, 60 Cherry Hills Rd., Concord, Ontario, Canada, L4K 1M4; Jeremy M. Harris, 476 Park Overlook, Worthington, Ohio 43085

[21] Appl. No.: 921,220

[22] Filed: Jul. 29, 1992

[51] Int. Cl.$^5$ ............................................. B64C 3/44
[52] U.S. Cl. .................................. 244/219; 244/90 R
[58] Field of Search .................. 244/219, 90 R, 123, 244/124

[56] References Cited

U.S. PATENT DOCUMENTS

| | | | |
|---|---|---|---|
| 1,517,765 | 12/1924 | Stout | 244/219 |
| 2,349,858 | 5/1944 | Gillmor | 244/219 |
| 3,172,621 | 3/1965 | Erwin | 244/219 X |
| 3,954,230 | 5/1976 | Machuta | 244/219 |
| 4,053,122 | 10/1977 | Gar | 244/22 |
| 4,312,486 | 1/1982 | McKinney | 244/219 |
| 4,624,203 | 11/1986 | Ferguson | 244/219 X |
| 5,004,189 | 4/1991 | Igram | 244/219 |
| 5,035,194 | 7/1991 | Dougherty | 244/219 X |

*Primary Examiner*—Joseph F. Peters, Jr.
*Assistant Examiner*—Christopher P. Ellis
*Attorney, Agent, or Firm*—Thomas S. Baker, Jr.

[57] ABSTRACT

A closed shear flexible panel has upper and lower surfaces each having front ends which define a leading edge and rear edges which define a trailing edge. The rear edges are slideable longitudinally with respect to each other when a torsional force is applied to the panel or a linear force is applied to the rear edges to induce a spanwise gradient pitch in the panel.

24 Claims, 6 Drawing Sheets

SPANWISE GRADED TWIST PANEL

BACKGROUND OF THE INVENTION

In the design of aerodynamic or streamlined fluid dynamic components such as airfoil panels utilized as wing surfaces, tail surfaces, propellers, ship stabilizers or other devices which move through a fluid medium, it is desirable sometimes to impart various amounts of spanwise twist or pitch to the components as a control function. A classic example of twisting or pitching a panel to obtain a control function may be seen in the wing warping technique utilized by the Wright Brothers and other aviation pioneers to obtain lateral control of their aircraft. Such early applications of wing twisting involved wings which had thin, cambered airfoil sections. These structures inherently had low torsional resistance and could be deformed easily when subjected to the application of a torsional force without sacrificing strength in bending.

As the development of airfoil panels has unfolded, the panels have become relatively thick and have two surfaces resulting in a substantially tubular shape in order to increase their efficiency. Additionally, the thickness of the panel walls has increased substantially. As a result, the panels are torsionally rigid. Consequently, when a modern airfoil panel is twisted about a spanwise axis through the application of a torsional force, the entire panel tends to pitch as a unit. In other words, the panel is pitched uniformly along its span. In contrast thereto, if the panel could flex in torsion the application of a torsional force to the panel would result in the panel pitching with a spanwise gradient. In this case the panel would be twisted by different amounts along its span. The ability to pitch a modern relatively thick airfoil panel with a spanwise gradient becomes advantageous in many instances. For example, where the panel is utilized as a flapping wing in an ornithopter, pitching the panel over a gradient from root to tip corresponds with the velocity vector of the fluid which flows over the panel, which is graded linearly from root to tip and increases the efficiency of the device.

In addition to the ability to pitch a modern two surface panel with a spanwise gradient when the panel has been subjected to a torsional force, it has been found to be desirable to be able to mechanically pitch the panel so as to impart a spanwise gradient independent of the application of a fluid-dynamic torsional force to the panel.

SUMMARY OF THE INVENTION

A shear flexible panel has a longitudinally extending upper surface having a first longitudinal front end, a first longitudinal rear edge and a first inner face. The panel also has a longitudinally extending lower surface having a second longitudinal front end, a second longitudinal rear edge and a second inner face. The first and second inner faces of the respective upper and lower surfaces cooperate to define an interior cavity within the panel. The first and second rear edges of the panel are slideable longitudinally with respect to each other when one of a torsional force is applied to the panel or a linear force is applied to one or both of the first and second rear edges to thereby induce a spanwise gradient pitch in the panel.

DESCRIPTION OF THE PREFERRED EMBODIMENT

Figure 1:
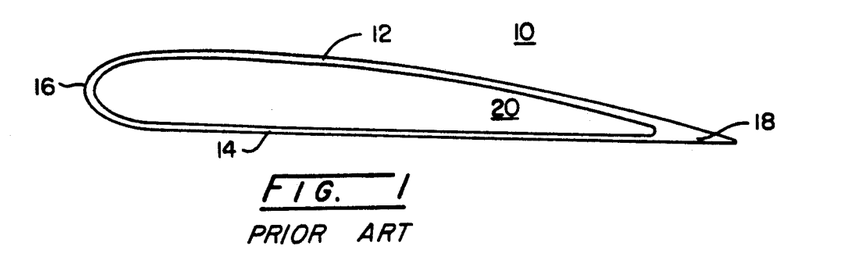
FIG. 1 is a cross sectional view of a traditional aerodynamic panel.
Figures 2, 4:
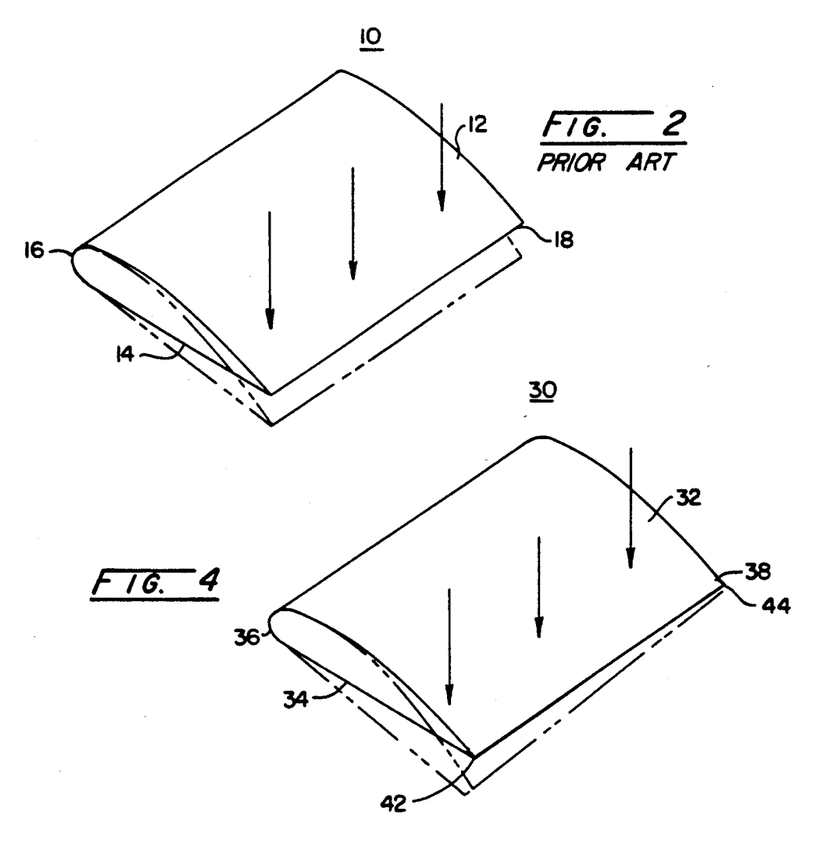
FIG. 2 is a perspective view of the panel of FIG. 1 showing that the panel is pitched the same amount chordwise along its span when subjected to a torsional force.
FIG. 4 is a perspective view of the panel in FIG. 3 illustrating that the pitch of the panel is graded spanwise when the panel is subjected to a torsional force.

The conventional modern airfoil panel (10) may be seen by referring to FIGS. 1 and 2 of the drawings. This panel has an upper surface (12) and a lower surface (14) which may be formed from a single piece of material or from two pieces of material and which together define a leading edge (16), a trailing edge (18) and enclose a hollow cavity (20). The upper and lower surfaces (12 and 14) have a wall thickness sufficient to ensure that the surfaces (12 and 14) are substantially rigid. In addition it is understood that spar and rib members may be used to reinforce the panel. Panel (20) has a closed tubular shape which acts to increase the structural efficiency and rigidity of the panel (10). When a torsional force is applied to one of the upper or lower surfaces (12 and 14) of panel (10) as depicted by the arrows acting on surface (12) in FIG. 2, the panel (20) tends to resist twisting and pitch as a rigid unit because of its closed tube structure.

Figure 3:
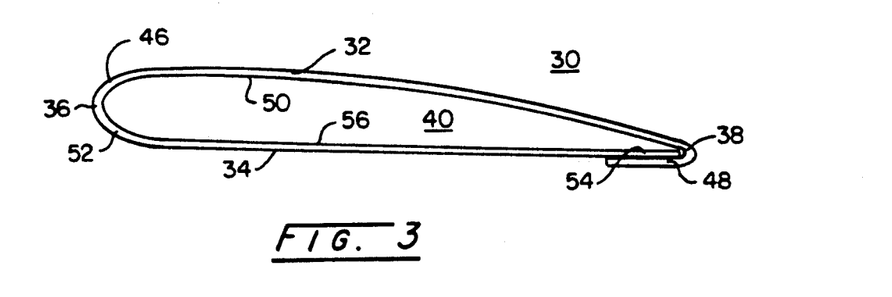
FIG. 3 is a cross sectional view of the shear flexible panel of the subject invention.

The simplest embodiment of the shear flexible panel (30) of the present invention provides a modern airfoil panel having thick, relatively rigid upper and lower surfaces (32 and 34), respectively which cooperate to define a substantially closed aerodynamic panel having a leading edge (36), a trailing edge (38) and an internal cavity (40) which may be seen by referring to FIGS. 3 and 4. However, in contrast to the conventional, rigid, closed aerodynamic panel (10) depicted in FIGS. 1 and 2, the panel (30) of the present invention will develop a pitch or twist having a spanwise gradient when subjected to a torsional force applied to one or both of the upper or lower surfaces (32 and 34) as depicted in FIG. 4. In FIG. 4, it may be seen that the trailing edge (38) of panel (30) has been pitched to a greater extent at a free end (42) than at an end (44) which has been fixed to another element such as a wing or a fuselage of an aircraft when subjected to a torsional force depicted by the arrows as acting on upper surface (32). The key to the greatly increased torsional compliance of the shear flexible panel (30) is that it permits spanwise shearing or relative sliding at the trailing edge (38) which enables the panel to assume a pitch gradient in a spanwise direction when subjected to a torsional force.

Looking again to FIG. 3, it may be observed that longitudinally extending upper surface (32) has a longitudinally extending front end (46), a longitudinally extending rear edge (48) and an inner face (50). Longitudinally extending lower surface (34) has a longitudinally extending front end (52), longitudinally extending rear edge (54) and inner face (56). Inner faces (50 and 56) serve to define the perimeter of cavity (40). It may be seen that rear edge (48) of upper surface (32) overlies and extends parallel to the rear edge (54) of lower surface (34). It should be noted that the rear edges (48 and 54) are not connected to each other; instead, the rear edges (48 and 54) are free to slide or move in shear relative to each other in a spanwise direction. In other words, spanwise shearing of the rear edges (48 and 54) may occur in response to a torsional force applied to the upper and/or lower surfaces (32 and 34). It may be seen that the upper and lower surfaces (32 and 34) are shown as constructed from a single continuous sheet of material such as aluminum or titanium. The surfaces also may be formed from a pair of sheets which are joined at a longitudinal seam along leading edge (36) or from any other combination of panels. Additionally, in the embodiment depicted in FIG. 3 the flexible panel (30) has one longitudinal rear edge (48) which wraps around, overlies and extends parallel with a second rear edge (54). For purposes of this invention, it is not necessary that one rear edge overlie or wrap around another rear edge. It is only necessary that the rear edges be located in close proximity to each other and be permitted to slide relative to each other in a spanwise direction. In fact, alternate embodiments of the flexible panel having surfaces with rear edges which do not overlie each other may be seen in FIGS. 5 through 8 described hereinbelow.

Figure 6:
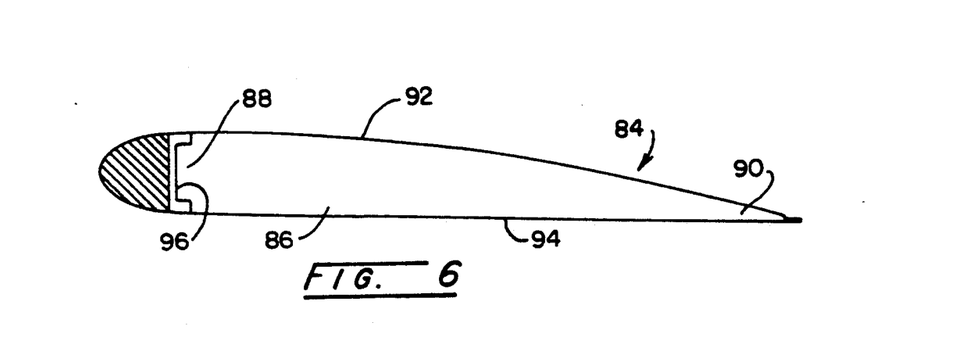
FIG. 6 is a view of a solid rib which may be utilized to reinforce the shear flexible panel of the subject invention.
Figure 7:
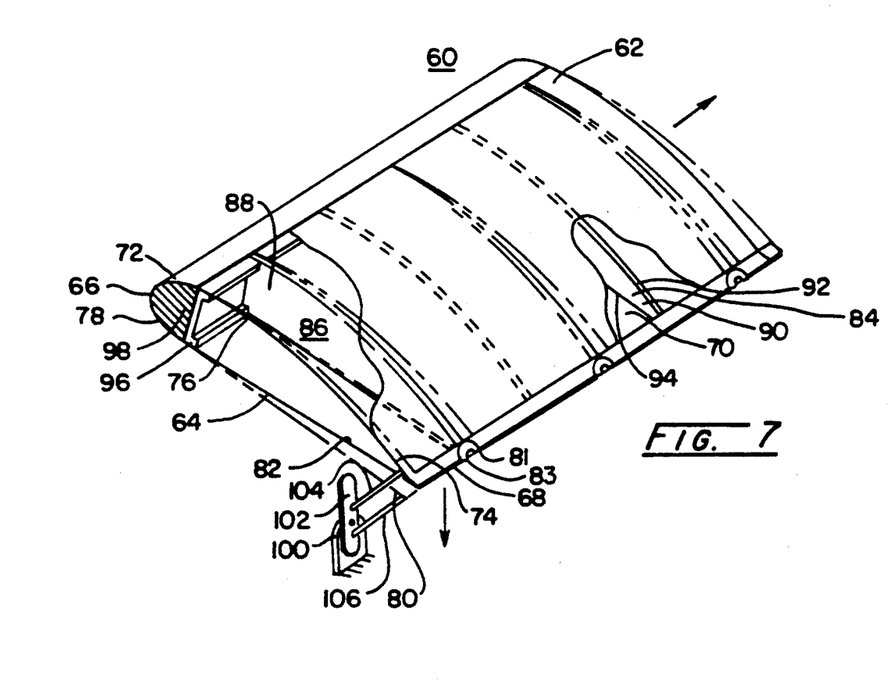
FIG. 7 is a perspective, part sectional, partially broken away view of a shear flexible panel incorporating the solid ribs depicted in FIG. 6.

Modern airfoil panels typically are reinforced with a combination of lateral or chordwise extending ribs and longitudinal or spanwise extending stringers. The flexible panel of the subject invention also may be constructed with a combination of ribs and stringers. Two embodiments of flexible panel (30) will be described in connection with FIGS. 5 through 8. Turning to FIGS. 6 and 7, the closed flexible aerodynamic panel (60) has an upper surface (62) and a lower surface (64) which define a leading edge (66), a trailing edge (68) and an interior cavity (70). Upper surface (62) has a longitudinally extending front end (72), a longitudinally extending rear edge (74) and an inner face (76). Similarly, lower surface (64) has a longitudinally extending front end (78), a longitudinally extending rear edge (80) and an inner face (82). It may be observed that the longitudinally extending rear edges (74 and 80) lie adjacent to each other and extend parallel to each other in a spanwise direction but neither of the edges (74 and 80) wraps around the other. A plurality of U shaped clips (81) positioned along the trailing edge (68) of panel (60) in a spanwise direction function to maintain the rear edges (74 and 80) in close proximity to each other but do not forcibly clamp the edges together. One end (83) of clip (81) is rigidly affixed to one rear edge (74) whereas the other end, not shown, merely overlies but is not affixed to rear edge (80). In this manner, the longitudinally extending rear edges (74 and 80) of the upper and lower surfaces (62 and 64) are permitted to slide freely with respect to each other when a torsional force is applied to the panel (60) in the manner depicted in FIG. 4.

Panel (60) is strengthened by a pair of chordwise extending solid ribs (84) one of which is shown in detail in FIG. 6. Rib (84) has a main body portion (86) with a nose (88) at one end, a tail (90) at the opposite end, a top perimeter surface (92) which complements and lies adjacent to a portion of the inner face (76) of upper surface (62) and a bottom perimeter surface (94) which complements and lies adjacent to a portion of the inner surface (82) of lower surface (64). Each rib (84) is mounted in cavity (70) of panel (60) by having its nose (88) secured in a channel (96) mounted within cavity (70) adjacent leading edge (66). Channel (96) is spaced from leading edge (66) by a longitudinally extending spar (98) which may be formed from a resilient material. Each of the solid ribs (84) in addition to having its nose (88) anchored within channel (96) also has one of its top perimeter surface (92) or its bottom perimeter surface (94) but not both bonded to the adjacent inner surface (76 and 82) of the upper and lower surfaces (62 and 64). Typically, one rib (84) would have its top perimeter surface (92) bonded to inner face (76) of upper surface (62) and an adjacent rib (84) on either side thereof would have its bottom perimeter surface (94) bonded to the inner face (92) of lower surface (64). In this manner, each rib (84) is fastened to one of the inner surfaces (76 and 82) but is free to slide spanwise with respect to the other inner surface (76 and 82).

From the above, it may be seen that rear edge (74) of upper surface (62) is free to slide spanwise with respect to rear edge (80) of lower surface (64) when a torsional force has been applied to the panel (60). The spanwise shearing or relative sliding that occurs at the trailing edge (68) of panel (60) embodies the panel with a torsional compliance when subjected to a torsional force. In some instances, controlled spanwise shearing at trailing edge (68) in order to achieve a desired amount of spanwise gradient pitching may be desirable. In this instance, torsional rigidity together with shearing may be accomplished by an actuator (100) shown schematically in FIG. 7. Actuator (100) may have a pivotal arm (102), an upper control link (104) connected pivotally to arm (102) and connected rigidly to rear edge (74) of upper surface (62) and a lower control link (106) connected pivotally to control arm (102) and connected rigidly to rear edge (80) of lower surface (64). The drive for actuator (100) may be hydraulic, mechanical, electrical or any combination thereof. In any event, when arm (102) is locked in position panel (60) becomes torsionally rigid. Operation of actuator (100) to rotate arm (102) in one direction or the other causes the panel to acquire a spanwise pitch gradient in one direction or the other. As previously mentioned, leading edge spar (98) may be constructed of a resilient material. It has been found that where spar (98) is formed of a resilient rigid material and bonded to the upper and lower surfaces (62 and 64), that the spar (98) will provide a restoring force in opposition to the rocking motion which occurs when actuator (100) has been activated. In other words, spar (98) acts in opposition to the spanwise pitch gradient forces which are imposed upon panel (60).

Figure 5:
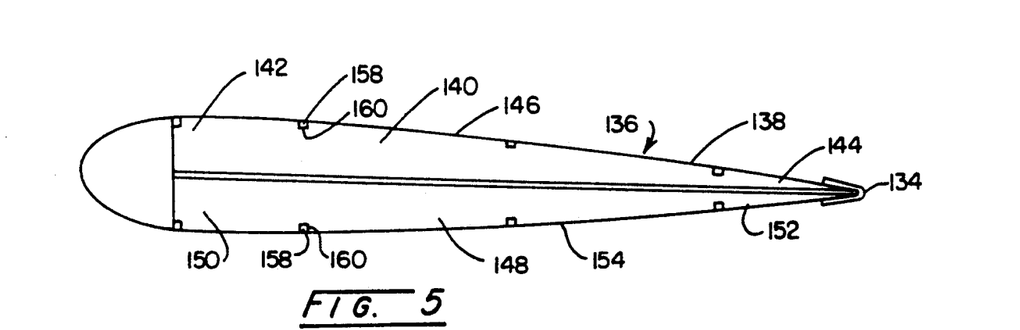
FIG. 5 is a view of a split rib which may be utilized to reinforce the shear flexible panel of the subject invention.
Figure 8:
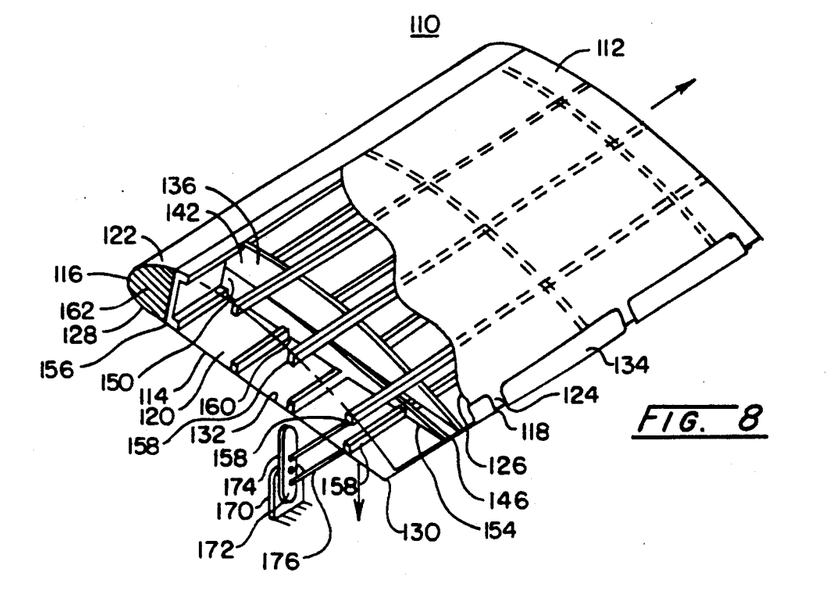
FIG. 8 is a perspective part sectional partially broken away view of a shear flexible panel incorporating a plurality of split ribs depicted in FIG. 5.

FIGS. 5 and 8 depict a flexible panel (110) having a plurality of chordwise extending split ribs and spanwise extending stringers. The closed flexible aerodynamic panel (110) has an upper surface (112) and a lower surface (114) which define a leading edge (116), a trailing edge (118) and an interior cavity (120). Upper surface (112) has a longitudinally extending front end (122) a longitudinally extending rear edge (124) and an inner face (126). Similarly, lower surface (114) has a longitudinally extending front end (128), a longitudinally extending rear edge (130) and an inner face (132). A longitudinally extending folded trailing edge clip (134) is attached to one of the longitudinal extending rear edges (124 and 130) and overlies but is not attached to the other. In this manner, the rear edges (124 and 130) are maintained in close proximity to each other and are free to slide or move in shear with respect to each other when a torsional force is applied to the panel (110).

The plurality of split ribs (136), one of which is depicted in detail in FIG. 5, are mounted in a chordwise direction within panel (110). Each of the split ribs (136) has a body (138) split longitudinally. Body (138) has a top section (140) having a top nose (142), a top tail (144) and a top perimeter surface (146) which compliments and lies adjacent to a portion of the inner face (126) of upper surface (112). Body (138) also has a bottom section (148) having a bottom nose (150), a bottom tail (152) and a bottom perimeter surface (154) which compliments and lies adjacent to the inner surface (132) of lower surface (114). Each of the split ribs (136) is mounted chordwise in flexible panel (110). The top nose (142) and the bottom nose (150) of the top and bottom sections (140 and 148) are securely mounted within a channel (156) mounted along leading edge (116). Additionally, the top perimeter surface (146) of section (140) is bonded to the inner face (126) of upper surface (112) and the bottom perimeter surface (154) of body section (148) is bonded to the inner face (132) of lower surface (114). A plurality of spanwise extending stringers (158) extend through notches (160) in the top and bottom sections (140 and 148) of rib (136) to further strengthen panel (110). Additionally, a spanwise extending spar (162) may be mounted along leading edge (116). Spar (126) may be resilient and may be bonded to the backside of channel (156). Spar (162) functions in the same manner as spar (98) of flexible panel (60) to provide a torsional restoring force in opposition to any spanwise torsional gradient induced within the panel (110).

As mentioned previously, a torsional force applied to one or both of the upper or lower surfaces (112 and 114) of panel (110) will cause the rear edges (124 and 130) of the upper and lower surfaces (112 and 114) to slide or move in shear with respect to each other to allow the panel to acquire a spanwise pitch gradient depending upon the torsional force applied to the panel. As discussed previously in connection with panel (60), oftentimes it is desired to have torsional rigidity at a given static or dynamic twist condition retained within the panel (110) or to induce a spanwise pitch gradient within the panel by directly controlling the movement of the rear edges (124 and 130). An actuator (170) having a rotatable drive arm (172) is shown schematically in FIG. 8. An upper control link (174) has one end pivotally connected to arm (172) and an opposite end connected to a spar (158) bonded to inner face (126) of upper surface (112). Similarly, a lower control link (176) has one end pivotally connected to arm (172) and the opposite end connected to a spar (158) bonded to the inner face (132) of lower surface (114). Actuator (170) may be driven by a hydraulic, electrical or mechanical device or a combination thereof connected to pivot arm (172) to cause the rear edges (124 and 130) to slide relative to each other to induce a desired spanwise pitch or twist gradient within the panel (110) or to maintain a desired spanwise gradient pitch within the panel.

Figure 9:
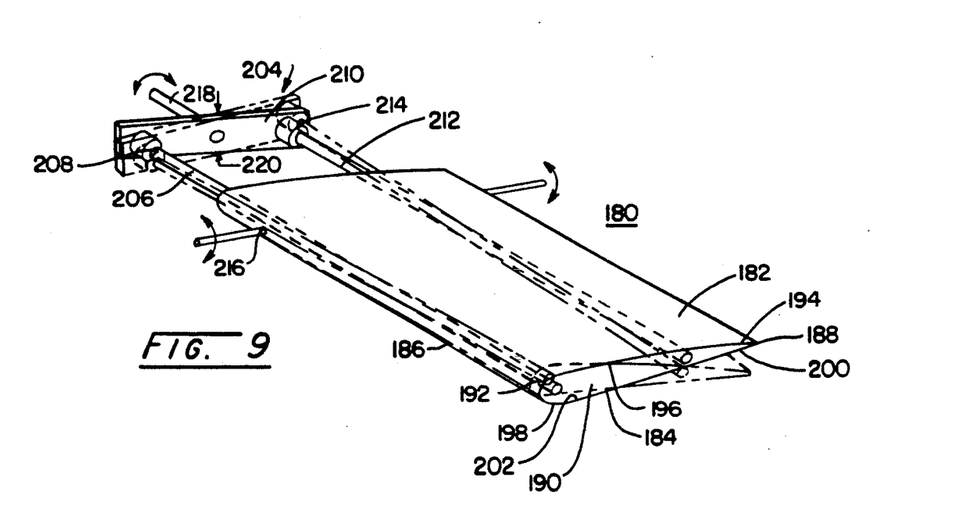
FIG. 9 is a perspective, part sectional view of a shear flexible panel having a pair of laterally pivotal forward and rearward spars which may be driven to induce a spanwise gradient pitch in the panel.

An alternate actuating means for imparting a torsional force to a shear flexible panel (180) may be seen by referring to FIG. 9. The closed aerodynamic panel (180) has an upper surface (182) and a lower surface (184) which define a spanwise extending leading edge (186), a spanwise extending trailing edge (188) and an interior cavity (190). Upper surface (182) has a longitudinally extending front end (192), a longitudinally extending rear edge (194) and an inner face (196). Lower surface (184) has a longitudinally extending front end (198), a longitudinally extending rear edge (200) and an inner face (202). Rear edges (194 and 200) are free to slide or move in shear with respect to each other as described previously in connection with the aforementioned shear flexible panels (30, 60 and 110). The mechanical control (204) depicted in connection with panel (180) differs from the trailing edge actuator described in connection with flexible panel (60 and 110) in that the actuators previously described operated to positively drive the rear edges of the upper and lower surfaces. In contrast thereto, the control depicted in connection with the flexible panel (180) operates to to twist the upper and lower surfaces (182 and 184) about a spanwise axis. Control (204) is shown schematically in FIG. 9. The control (204) is intended to be mounted within cavity (190). Control (204) includes a forward spanwise extending spar (206) mounted within the ball of a ball and socket assembly (208) rigidly secured to a link (210). Control (204) has a rearward spanwise extending spar (212) mounted within cavity (190) intermediate the leading and trailing edges (186 and 188) o panel (180). One end of rearward spar (212) is mounted within the ball of a ball and socket assembly (214) rigidly mounted to control link (210). Each of the forward and rearward spars (206 and 212) are pivotally mounted on a laterally extending pivot shaft (216) which passes through bores in the spars (206 and 212) and which extends between the leading and trailing edges (186 and 188) of panel (180). Control link (210) which may be mounted at one end of panel (180) may be rotated about an axial shaft (218), by means not shown, to thereby differentially pivot the forward and rearward spars (206 and 212) about the pivot shaft (216). The pivoting means may be electrical, hydraulic, mechanical or any combination thereof. When this occurs the end of one of the spars (206 and 212) located within panel (180) remote from ink (210) moves upwardly and simultaneously the end of the other spar (206 and 212) located within the panel (180) remote from link (210) extends downwardly to thereby impart a torsional force which results in a spanwise gradient pitch within the panel.

Referring to FIG. 9, it may be observed that the rear edge (194) of panel (180) moves from the solid line position to that depicted in dotted lines when the end of rearward spar (212) within panel (180) is pivoted downwardly about the lateral shaft (216) while simultaneously the end of the forward spar (206) within the panel pivots upwardly. The degree of pivot determines the amount of spanwise pitch gradient induced within the panel (180). Additionally, although not shown, the control link (210) may be reciprocated vertically to cause the spars (206 and 212) and the control link (210) to pivot as a unit about the lateral pivot shaft (216). This direction of movement is indicated by the arrows (220). Such movement may be desirable to provide an additional control for panel (180).

Figure 10:
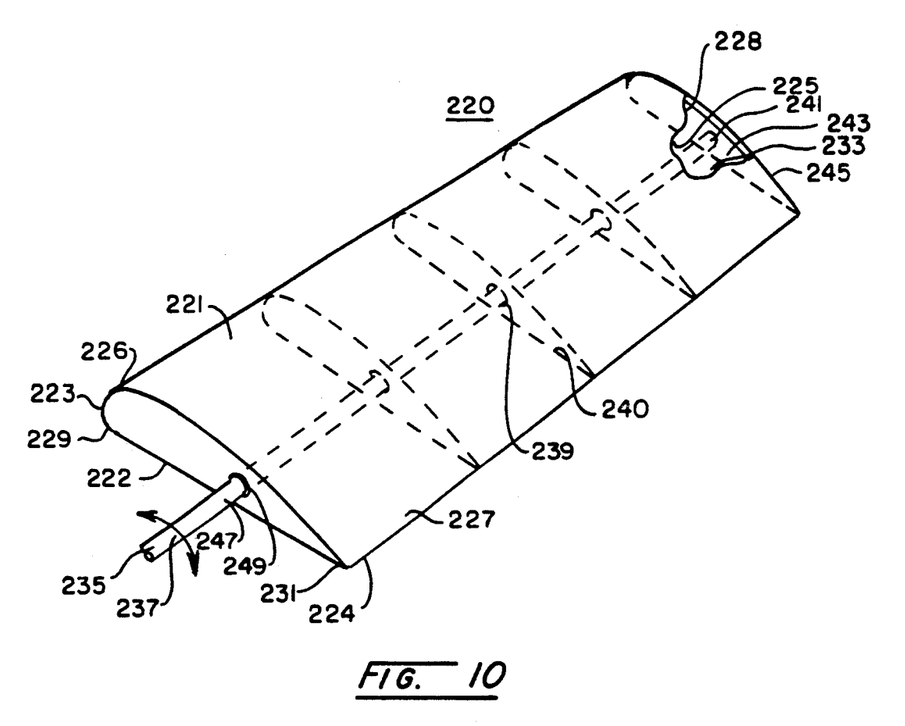
FIG. 10 is a perspective part sectional, partially broken away view of a shear flexible panel having a rotary spar rigidly affixed to the tip of the panel which may be driven to twist the tip and induce a spanwise gradient pitch in the panel.

Another alternate actuating means for imparting a torsional force to a shear flexible panel (220) may be seen schematically by referring to FIG. 10. The closed aerodynamic panel (220) has an upper surface (221) and a lower surface (222) which define a spanwise extending leading edge (223), a spanwise extending trailing edge (224) and an interior cavity (225). Upper surface (221) has a longitudinally extending front end (226), a longitudinally extending rear edge (227) and an inner face (228). Lower surface (222) has a longitudinally extending front end (229), a longitudinally extending rear edge (231) and an inner face (233). The rear edges (227 and 231) are in close proximity to each other but are free to slide or move in shear with respect to each other as described previously in connection with the aforementioned shear flexible panels (30, 60, 110 and 180). The rotary spar actuator control (235) described in connection with panel (220) functions in a manner similar to that of control (204) described in connection with panel (180) in that it acts to twist the upper and lower surfaces (221 and 222) about a spanwise axis. Control (235) includes a laterally centrally positioned spanwise extending spar (237) which passes through openings (239) formed in internal ribs (240). The outer end (241) of spar (237) is fixedly attached to the mid-section of a rib (243) at the tip (245) of panel (220). The rib (243) may be attached to the inner faces (228 and 233) of the upper and lower surfaces (221 and 222). The inner end (247) of spar (237) is mounted in a bearing (249) at the root of panel (220). Spar (237) may be rotated in either direction by means, not shown. The rotating means may be electrical, hydraulic, mechanical or a combination thereof. When spar (237) rotates the trailing edge of rib (243) pivots upwardly or downwardly to thereby impact a torsional force to the tips of upper and lower panel surfaces (221 and 222) which cause a spanwise gradient pitch within the panel (220).

Figure 11:
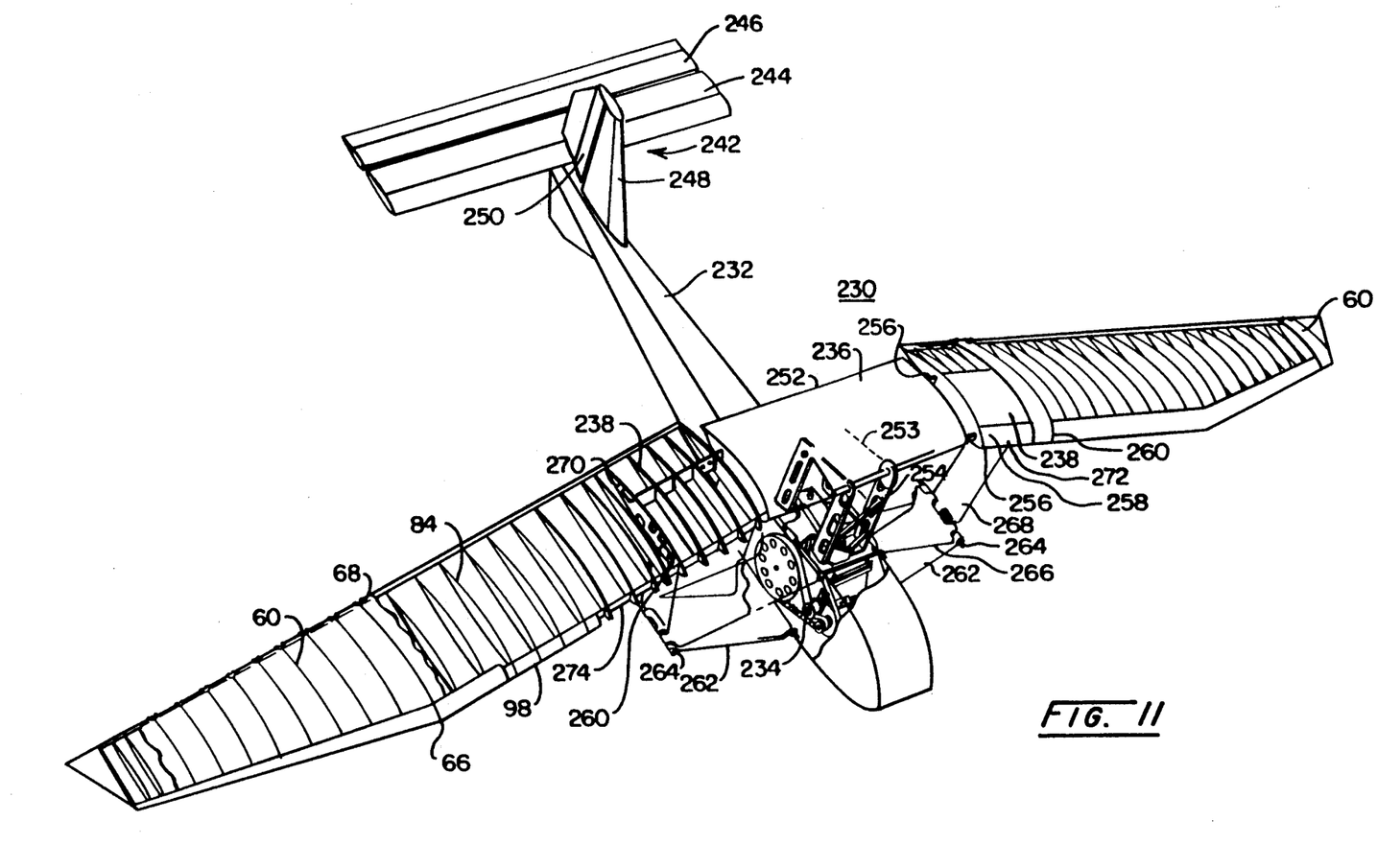
FIG. 11 is a perspective view, partially broken away of an ornithopter incorporating a pair of the shear flexible panels of the subject invention.

As discussed above, the shear flexible panel (60) of the present invention which will assume a graded pitch in a spanwise direction when subjected to a torsional force or when the rear edges (74 and 80) are driven by an actuator device may be utilized as a wing surface in an aircraft. Use of panel (60) in connection with a flapping wing airplane or ornithopter (230) may be seen by referring to FIG. 11. FIG. 11 discloses an ornithopter generally. However, U.S. Pat. No. 4,139,171 the sole inventor of which also is an inventor of the shear flexible panel of the present application fully describes in detail the ornithopter (230). This patent hereby is included by reference thereto as fully as if set out and rewritten in its entirety in this application. Ornithopter (230) includes a body (232), a drive mechanism (234), a center wing segment (236), a transfer wing segment (238) and a flexible wing panel (60). The body (232) may be of conventional monocoque construction. Power for the drive mechanism (234) may be provided by a conventional electric or internal combustion engine, not shown, drivingly attached thereto. The tail section (242) of body (232) includes conventional horizontal stabilizers (244) with elevators (246) and a vertical stabilizer (248) with a rudder (250).

Center wing segment (236) has an airfoil configuration not unlike panel (10) shown in FIG. 1. Drive mechanism (234) attaches to the bottom surface (252) of center wing segment (236) by means of being bolted to a metal plate (253) rigidly attached to a plurality of upright members (254) of drive mechanism (234). Preferably, drive mechanism (234) is a scotch yoke mechanism which translates rotary motion of a prime mover into reciprocating motion. When drive mechanism (234) operates, upright members (254) and metal plate (253) are driven in reciprocation which forces center wing segment (236) to reciprocate. The rate of reciprocation is determined by the speed of the prime mover.

Center wing segment (236) has a pair of lateral pivot joints (256) which connect the segment to the inner end (258) of transfer wing segments (238). The transfer wing segment (238) has an outer end (260) which provides a fixed pivot axis for the segment as described hereinbelow. An outrigger (262) extends upwardly from the lower portion of body (232). A second outrigger (266) having one end attached to body (232) and the other end attached to outrigger pivot (264) functions to form a rigid structure with outrigger (262). A pivot link (268) pivotally connects to outrigger pivot (264) and to a pivot (270) mounted at the outer end (260) of transfer wing segment (238). Consequently, when center wing segment (236) is reciprocated transfer wing segment (238) pivots laterally about the fixed pivot (270) at the outer end (260) thereof.

Shear flexible panel (60) is connected to the outer end (260) of transfer wing segment (238) by elastic spar (98). In other words, the only attachment of flexible panel (60) to the outer end (260) of transfer wing segment (238) is through spar (98) which extends continuously along the leading edge (272) of transfer wing segment (238). In FIG. 11, the web (274) of spar (98) has been exposed to disclose the construction of the panel. Spar (98) preferably is a foam filled tube. The leading edge (66) of panel (60) may be covered with Kevlar material which would provide an outer coating for spar (98). The web of the spar may be a combination of plywood and carbon or any other preferred materials.

Figure 12:
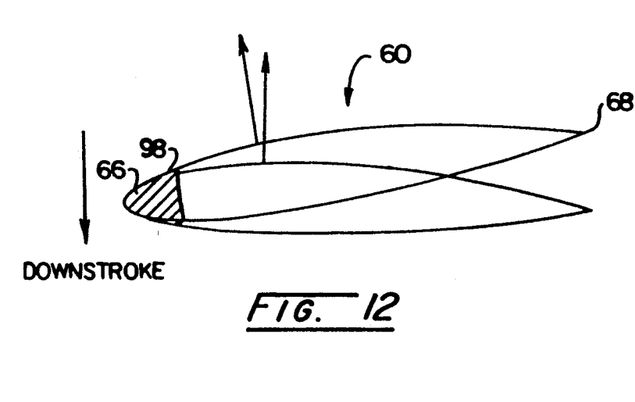
FIG. 12 is a cross sectional view of a shear flexible panel having a torsionally elastic spar illustrating the aerodynamic forces tending to twist or pitch the panel.
Figure 13:
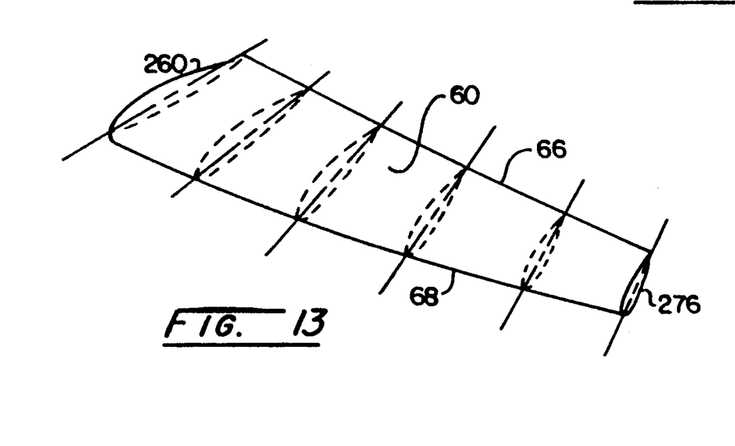
FIG. 13 is a perspective view of a shear flexible panel incorporated as an outer wing in an ornithopter illustrating the spanwise gradient pitch which occurs when the panel is driven by an inner panel and subjected to aerodynamic forces.

It should be apparent that panel (60) will pitch or twist about the axis of spar (98) in a direction opposite to the direction of movement of the outer end (260) of transfer wing segment (238). In other words, when outer end (260) is driven downwardly through the action of the movement of center wing segment (236), the upwardly directed pressure of the air on the panel (60) will cause the trailing portion of the panel to pivot upwardly about the longitudinal axis of spar (98). This movement of panel (60) in opposition to the direction of movement of the outer end (260) of transfer segment (238) may be seen by referring to FIG. 12. Additionally, because the rear edges (74 and 80) of the upper and lower surfaces (62 and 64) of panel (60) are free to slide or shear with respect to each other, the pitch of panel (60) will be graded in a spanwise direction as illustrated in FIG. 13. In FIG. 13 it may be observed that the trailing edge (66) of panel (60) is twisted the greatest amount at the tip (276) thereof. In other words, the pitch of panel (60) increases spanwise from the root (260) at the point of attachment of spar (98) to the tip (276) of the panel (60).

Figure 14:
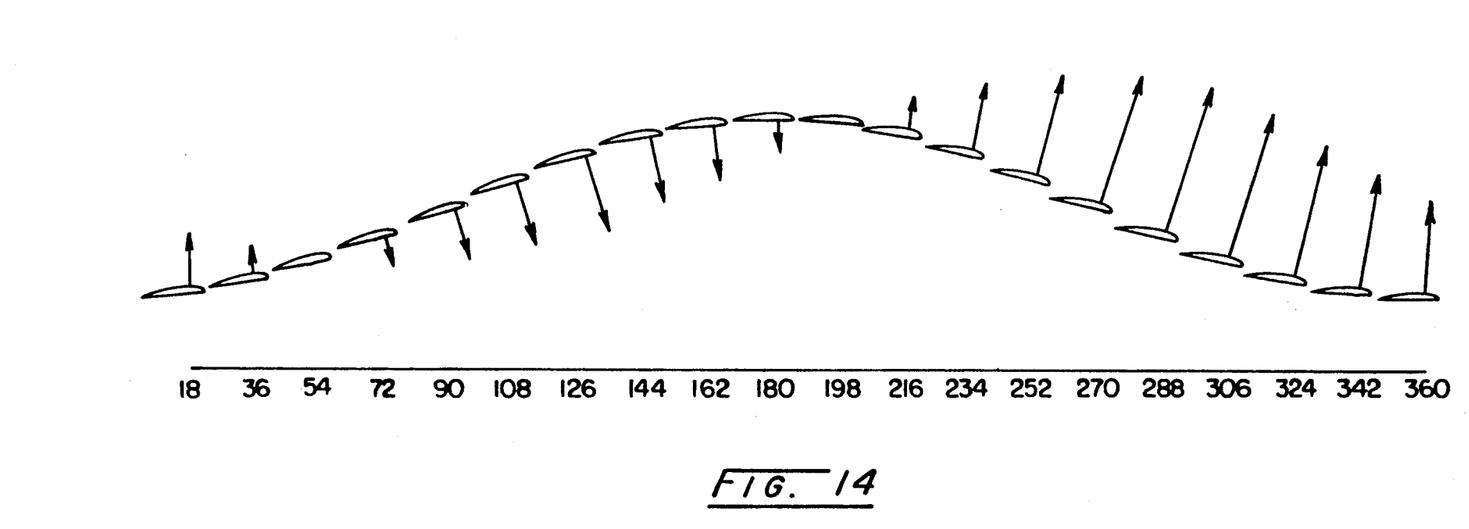
FIG. 14 is a sequential cross sectional view of a shear flexible panel illustrating how pitch angle and aerodynamic force at a given span station vary over one complete flapping cycle of an ornithopter.

The sequential view of FIG. 14 illustrates how one spanwise portion of shear flexible ornithopter wing panel (60) pitches in response to the varying net aerodynamic forces during a complete flapping cycle. The force is negative during most of the upstroke, and causes the panel to pitch in the trailing edge-down sense. The force is positive over most of the downstroke and causes the panel to pitch in the trailing edge up sense. On both upstroke and downstroke the net force is inclined forward, showing that useful propelling thrust is being developed. Overall, the upward forces predominate and create a net lift which sustains the ornithopter in flight. The primary purpose of the twisting action is to avoid loss of lift and thrust resulting from dynamic stall due to excessive angles between the incoming air and the wing.

Although use of the shear flexible panels of the present invention has been described in connection with a flapping wing aircraft, the fact that this panel may be used to control dynamic twist of relatively thick airfoil sections enables it to be utilized for other applications. These include wing-twisting lateral control for sailplanes, a V-tail for a fixed wing aircraft giving full aerodynamic control (pitch and yaw) with essentially fixed and gapless panels, a variable pitch propeller for ultralight and man-powered aircraft, a continuously twistable control surface for aircraft or missiles, a pitch control for turbine or compressor blades, a steerable keel structure on ships, and as a control for twisting of non-aerodynamic structures such as antenna scanners and solar reflectors.

Since certain changes may be made to the above described apparatus, system and method without departing from the scope of the invention herein, it is intended that all matter contained in the description thereof or shown in the accompanying drawings shall be interpreted as illustrative and not in a limiting sense.

We claim:

1. A shear flexible panel which comprises:
   a longitudinally extending upper surface having a first longitudinal front end; a first longitudinal rear edge and a first inner face;
   a longitudinally extending lower surface having a second longitudinal front end, a second longitudinal rear edge and a second inner face;
   wherein said first and said second inner faces cooperate to define an interior cavity;
   wherein said first and second front ends cooperate to form a leading edge and said first and second rear edges cooperate to form a trailing edge; and
   wherein said first and said second rear edges are slidable longitudinally with respect to each other when one of a torsional force is applied to said panel or a linear force is applied to at least one of said first and second rear edges to thereby induce a spanwise gradient twist extending longitudinally in said panel.

2. The panel of claim 1 in which a portion of one of said first and second rear edges overlies a portion of said other first and second rear edges.

3. The panel of claim 1 further comprising:
   at least one rib mounted laterally in said cavity;
   wherein said rib has a body with a nose at one end and a tail at the opposite end and a top perimeter surface high complements and lies adjacent to a portion of said first inner face defining said cavity and a bottom perimeter surface which complements and lies adjacent to a portion of said second inner face defining said cavity; and
   wherein one of said top and bottom perimeter surfaces is rigidly attached to and movable with its respective adjacent first or second inner face and the other of said top and bottom perimeter surfaces is detached from and movable with respect to its respective adjacent first or second inner face.

4. The panel of claim 3 further comprising:
   a longitudinally extending torsionally elastic spar mounted within said cavity adjacent said leading edge and remote from said first and second rear edges; and
   wherein said rib nose is rigidly affixed to said spar.

5. The panel of claim 1 further comprising;
   at least one rib mounted laterally in said cavity;
   wherein said rib has a body with a nose at one end, a tail at the opposite end, a top perimeter surface which compliments and lies adjacent to a portion of said first inner surface defining said cavity and a bottom perimeter surface which compliments and lies adjacent to a portion of said second inner surface defining said cavity; and
   drive means attached to said rib for rotating said rib to impart a torsional force to said panel.

6. The panel of claim 5 in which said panel has a root at one end and a tip at the other end and said rib is located adjacent the tip of said panel and said drive means includes a rotatable spar which extends longitudinally within said interior cavity from the root to the tip of said panel.

7. The panel of claim 3 further comprising;
   at least one rib mounted laterally in said cavity;
   wherein said rib has a body with a nose at one end, a tail at the opposite end, a top perimeter surface which compliments and lies adjacent to a portion of said first inner surface defining said cavity and a bottom perimeter surface which compliments and lies adjacent to a portion of said second inner surface defining said cavity; and
   drive means attached to said rib for rotating said rib to impart a torsional force to said panel.

8. The panel of claim 7 in which said panel has a root at one end and a tip at the other end and said rib is located adjacent the tip of said panel and said drive means includes a rotatable spar which extends longitudinally within said interior cavity from the root to the tip of said panel.

9. The panel of claim 1 further comprising:
   actuator means attached to one of said first and second rear edges for sliding one of said first and second rear edges longitudinally with respect to the other of said first and second rear edges to impart a torsional force to said panel.

10. The panel of claim 3 further comprising:
    actuator means attached to one of said first and second rear edges for sliding one of said first and second rear edges longitudinally with respect to the other of said first and second rear edges to impart a torsional force to said panel.

11. The panel of claim 1 further comprising:
at least one rib mounted laterally in said cavity;
wherein said rib has a body split longitudinally into a top section having a top nose at one end and a top tail at the opposite end and a top perimeter surface which complements and lies adjacent to a portion of said first inner face defining said cavity and a bottom section having a bottom nose at one end and a bottom tail at the opposite end and a bottom perimeter surface which complements and lies adjacent to a portion of said second inner face defining said cavity;
wherein said top perimeter surface of said top section is rigidly attached to and movable with said first inner face and said bottom perimeter surface of said bottom section is attached to and movable with said second inner face.

12. The panel of claim 11 further comprising;
a longitudinally extending torsionally elastic spar mounted within said cavity adjacent to said leading edge and remote from said first and second rear edges; and
wherein said top and bottom noses are affixed to said spar.

13. The panel of claim 11 further comprising:
a plurality of spanwise extending stringers rigidly affixed to one of said top section or said bottom section of said rib.

14. The panel of claim 12 further comprising;
at least one solid rib mounted laterally in said cavity;
wherein said solid rib has a body with a nose at one end, a tail at the opposite end, a top perimeter surface which compliments and lies adjacent to a portion of said first inner surface defining said cavity and a bottom perimeter surface which compliments and lies adjacent to a portion of said second inner surface defining said cavity; and
drive means attached to said rib for rotating said rib to impart a torsional force to said panel.

15. The panel of claim 11 further comprising:
actuator means attached to one of said first and second rear edges for sliding one of said first and second rear edges longitudinally with respect to the other of said first and second rear edges to impart a torsional force to said panel.

16. The panel of claim 1 further comprising:
a clip having a first body element affixed to one of said first and said second rear edges and a second body element which overlies the other of said first and second rear edges to retain said first and second rear edges in close cooperation with each other while allowing said first and second rear edges to slide with respect to each other.

17. The panel of claim 1 in which said upper surface and said lower surface are formed from a single element.

18. The panel of claim 1 further comprising:
twist means for causing said shearflex panel to twist about a spanwise axis;
wherein said twist means comprises mechanical force means for applying a mechanical force to said first and second inner faces of said shearflex panels.

19. The panel of claim 18 in which said mechanical force means comprises:
a spanwise extending forward spar and a spanwise extending rearward spar mounted within said shearflex panel; a first lateral pivot for said forward spar; a second lateral pivot for said rearward spar; and first drive means connected to said forward and rearward spars to cause said spars to be rocked differentially about their respective lateral pivots.

20. The panel of claim 19 which further comprises: a first drive pivot attached to one end of said forward spar; a second drive pivot attached to one end of said rearward spar; and said second drive means being connected to both said first and second drive pivots.

21. The panel of claim 20 in which said second drive means further comprises a third drive means to cause said forward and rear spars to be rocked in parallel about said lateral pivots.

22. The panel of claim 20 in which each of said first and second drive pivots have ball joints.

23. The panel of claim 22 in which said second drive means includes a connecting link which mounts each of said ball joints for said first and second drive pivots.

24. The panel of claim 23 in which said third drive means operates to move said connecting link vertically.

* * * * *